Feb. 17, 1942.  B. C. JOHNSON  2,273,525
SPOOL
Filed Nov. 2, 1939
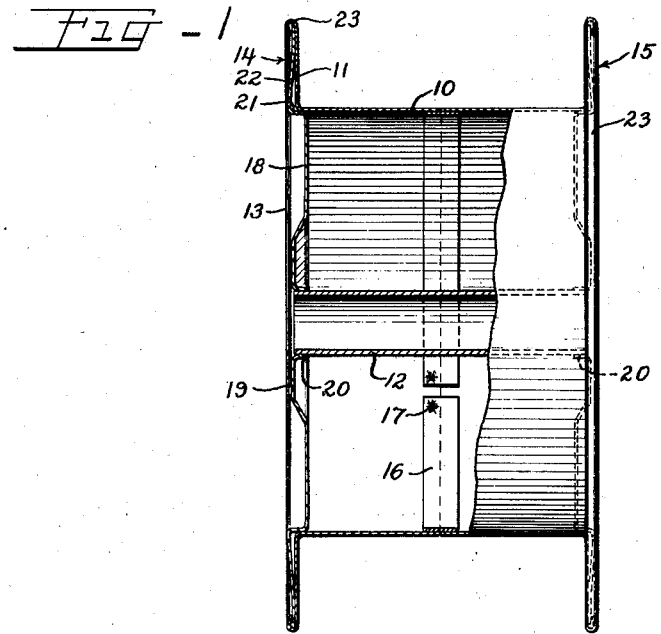
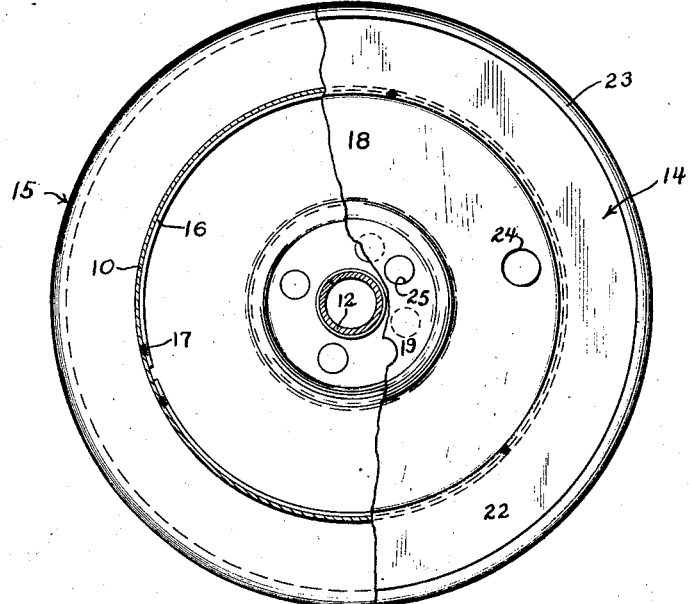
Inventor
Bernard C. Johnson
by Charles Hill
Attys Patented Feb. 17, 1942

2,273,525

UNITED STATES PATENT OFFICE 2,273,525

SPOOL

Bernard C. Johnson, Libertyville, Ill., assignor to Houdaille-Hershey Corporation, Detroit, Mich., a corporation of Michigan Application November 2, 1939, Serial No. 302,475

1 Claim. (Cl. 242—123)

The present invention relates in general to metal reels, spools or the like, such as are commonly employed in the reeling or spooling of wire and similar materials, and has for a primary object the provision of an improved construction, which is of simple design and enables the economical manufacture of an exceptionally strong spool from relatively light material.

A further object of the invention is to provide a spool of the herein described type in which the end disks of the spool heads are so formed and associated with the ends of the spool barrel as to support the barrel throughout its circumference against external compressing forces.

Another object of the invention is to provide a spool of such character in which the end disks of the spool heads have peripheral margins overlying end flanges on the spool barrel, and in which the associated end flanges and peripheral margins at each end of the spool are converged outwardly and connected at their adjacent edges so as to effect a very rigid and strong construction.

Another and further object of the herein described invention is to provide a spool of the above nature in which the spool barrel is of two-part construction, these two parts being connectively joined between the spool ends by a novel joint arrangement of simple but strong construction.

Other objects and features of the invention will more fully appear from the following detailed description, taken in connection with the accompanying drawing which illustrates a preferred embodiment thereof, and in which:

Figure 1 is a side elevation, partially broken away and shown in section, of a metallic spool embodying the principles of the herein described invention; and Figure 2 is an end elevation thereof, portions being broken away and shown in section to disclose certain details of construction.

As shown on the drawing:

As illustrative of one form of construction, embodying the features of the present invention, the drawing discloses the spool as comprising a main barrel 10 terminating in end flanges 11, this barrel being concentrically disposed around a tubular central hub or spindle 12. At its respective ends, the hub 12 is associated with end disks 13 which are cooperatively associated with the end flanges 11—11 of the barrel to form spool heads as generally indicated at 14 and 15.

The barrel 10 is of two-part construction, these two parts being similarly formed and placed with their tubular barrel forming portions in end-to-end abutting relation. In order to facilitate the end abutting relation. In order to facilitate the aligning and assembly of the barrel forming parts, one of the tubular barrel portions is provided with an inner ring strip 16 which is initially secured internally of one of the abutting ends along one side at spaced points as by welding, as shown at 17. This strip is initially secured to only one of the parts and projects past the end of the part to which it is secured so that, when the other tubular part of the barrel is slipped over the projecting portion of the ring, the adjacent ends of the barrel portions will be brought into abutting relation and aligned substantially centrally of the strip.

Each end disk is stamped or otherwise shaped to provide an inwardly offset boss portion 18 and an outwardly offset boss portion 19, the boss portions being concentrically disposed and extending circumferentially about the disk center. At the center of the boss 19, the disk is apertured and the edge inwardly deflected to form an inturned flange 20 for receiving the end of the hub member.

The inwardly deflected bosses 18 at their peripheral margins define a circumferentially extending shoulder 21 adapted to receive thereover in tight fitting relation one end of the barrel 10.

From the shoulder 21, the peripheral margin of the disk is inclined to form an annular portion 22 which is in converging relation with the adjacent barrel end flange 11, this portion and the adjacent end flange converging adjacent their outermost edges, and the end flange being beaded over the edge of the portion, as shown at 23, to secure the barrel and end disk together. By disposing the end flange and associated inclined disk portions so that they are in converged relation, the spool heads are materially strengthened, and by seating the barrel end on the shoulder 21, the barrel is effectively supported throughout its circumference against compressive forces.

The end disks are further strengthened by the employment of the construction embodying the concentrically offset portions.

If desired, openings 24 may be provided in the disk ends for receiving suitable driving studs for rotating the spool during the winding of wire or other materials thereon.

With the parts assembled as shown in Figures 1 and 2 of the drawing, the engaged parts may be secured together in bonded relation in any well known manner. For example, the parts may be brazed together by first placing brass shim stock between the engaged surfaces, or by copper plating. The surfaces may then be bonded by subjecting the entire spool to sufficient temperature to cause the brazing metal to flow.

In the construction disclosed, communication with the interior of the spool barrel may be established by providing a series of spaced openings 25 in the outwardly offset portion 23 at each end of the spool.

From the foregoing description, it will be apparent that the present invention provides an improved spool construction which enables the economical manufacture of an exceptionally strong spool from relatively light material; in which the end disks of the spool head are so formed and associated with the ends of the spool barrel as to support the barrel throughout its circumference against external compressing forces; which embodies a novel construction wherein overlying portions of the end disks and barrel flanges are in converged angular relation and connected at their engaged edges so as to effect a very rigid and strong construction; and which embodies a novel barrel construction, wherein the barrel is assembled from two similar parts which are connectively joined between the spool ends and reinforced in a novel manner.

It is, of course, to be understood that although I have described in detail a preferred embodiment of my invention, the invention is not to be thus limited, but only in so far as defined by the scope and spirit of the appended claim.

I claim as my invention:

An all-metal spool comprising a sheet-metal tubular barrel having its end portions deflected radially to form annular flanges, heads for said spool in the form of integral sheet-metal discs, means securing said heads at their peripheries to the peripheries of said flanges, said heads being inwardly offset to form annular bosses defining annular external shoulders extending only part way into the respective ends of the barrel to closely fit the barrel ends to strengthen the barrel radially, the annular portions of said heads between their peripheries and the outer ends of said shoulders being inclined relative to said flanges to form braces for stiffening said flanges and holding them in their radial planes during winding of the spool, said heads having axial openings, and a tubular core extending with its ends through said openings and being secured to said heads to maintain the engagement of said shoulders with the barrel ends.

BERNARD C. JOHNSON.